United States Patent [19]
Murase et al.

[11] Patent Number: 5,689,310
[45] Date of Patent: Nov. 18, 1997

[54] EADER DEVICE

[75] Inventors: Hirofumi Murase, Kanagawa; Masato Kajimoto; Akihiro Kikuchi, both of Chiba, all of Japan

[73] Assignee: Sony Corporation, Tokyo, Japan

[21] Appl. No.: 546,805

[22] Filed: Oct. 23, 1995

[30] Foreign Application Priority Data

Oct. 31, 1994 [JP] Japan .................................. 6-266789

[51] Int. Cl.$^6$ ...................................................... H04N 9/74
[52] U.S. Cl. ................................................. 348/595; 348/594
[58] Field of Search ................................. 348/595, 590, 348/591, 584, 586, 594; 395/119; 358/518, 464, 448

[56] References Cited

U.S. PATENT DOCUMENTS

| | | | |
|---|---|---|---|
| 3,911,418 | 10/1975 | Takeda | 340/324 AD |
| 4,851,912 | 7/1989 | Jackson et al. | 358/183 |
| 4,947,240 | 8/1990 | Hausdorfer | 348/595 |
| 5,313,566 | 5/1994 | Hedley et al. | 348/584 |
| 5,347,622 | 9/1994 | Takemote | 348/590 |
| 5,382,980 | 1/1995 | Gehrmann | 348/591 |
| 5,416,529 | 5/1995 | Lake | 348/590 |

*Primary Examiner*—Thomas D. Lee
*Assistant Examiner*—Jerome Grant, II
*Attorney, Agent, or Firm*—Jay H. Maioli

[57] ABSTRACT

A fader device for processing picture data supplied from outside, such as from a video tape recorder or a camera, with fade-in or fade-out processing with a desired color. For fade-in, a subtractor subtracts the color picture data supplied from a designated color picture data forming unit from picture data supplied from outside and transmits the resulting difference data to a multiplier, which then multiplies picture data from the subtractor with a gradually increasing coefficient supplied from the gain control unit and routes the result of multiplication to an adder. The adder adds picture data supplied from the multiplier to the color picture data supplied from the designated color picture data forming unit and routes the resulting addition signal to a monitor unit. For fade-out, the subtractor subtracts the color picture data supplied from the designated color picture data forming unit from data supplied from outside and routes the resulting difference signal to the multiplier. The multiplier multiplies picture data from the subtractor with a gradually decreasing coefficient supplied from the gain control unit and routes the result of multiplication to an adder. The adder adds picture data supplied from the multiplier to the color picture data supplied from the designated color picture data forming unit and routes the resulting addition signal to a monitor unit.

3 Claims, 4 Drawing Sheets

O = K(I−Z)+Z
Z : FADER CONVERGING COLOR
I : INPUT DATA
O : OUTPUT DATA
K : GAIN

FADER DEVICE

BACKGROUND OF THE INVENTION

1. Field of the Invention

This invention relates to a fader device for processing picture data supplied from outside, such as from a video tape recorder or a camera, with fade-in or fade-out before outputting the picture data. More particularly, it relates to a fader device capable of processing with fade-in or fade-out with a desired color.

2. Related Background Art

Nowadays, fade-in for gradually changing a picture so far displayed to a white-colored picture or a black-colored picture or fade-out for gradually displaying a desired picture from a white-colored picture is employed at a transition between pictures.

The conventional fader device for executing this fade-in or fade-out is comprised of a white picture forming circuit for forming white picture data for displaying a white picture, an addition circuit for adding the white picture data and picture data of a desired color and supplying the resulting picture data to a monitor device, and an addition control circuit for variably controlling the ratio of the white picture data to be added by the addition circuit.

The addition control circuit has a rotary knob adapted to be manually operated by a user. Fop fade-in, the user operates the rotary knob so that the addition Patio between the white picture data and the desired picture data will be 1:0. This supplies only the white picture data to the monitor device by the addition circuit to display the white picture.

The user then operates the rotary knob, depending on the speed of the fade-in operation, so that the addition ratio of the white picture data will be gradually smaller. This decreases the addition ratio of the white picture data added by the addition circuit depending upon the operating state of the rotary knob while increasing the addition ratio of the desired picture data. Thus a picture displayed on the monitor device is gradually changed from the white picture to a picture corresponding to the desired color data.

Finally, the rotary knob is acted upon so that the addition ratio of the white picture data to the desired picture data will be 0:1, whereby only the desired picture data is supplied by the addition circuit to the monitor device. Thus a picture corresponding to only the desired picture data is displayed on the monitor device.

Such fade-in is employed mainly at a beginning portion of a transition of scenes. The reason is that the fade-in of gradually displaying a picture from the white picture has a visual effect of permitting the viewer to recognize the beginning of a new picture more clearly than with the usual method of abruptly changing one picture to another picture.

The fade-out operation is now explained. The addition ratio of the white picture data to desired picture data in the addition circuit is initially 0:1. The user acts on a rotary knob of the addition circuit so that the addition ratio of the white picture data will be increased gradually. This increases the addition ratio of the white picture data added by the addition circuit depending upon the operating state of the rotary knob, while decreasing the addition ratio of the desired picture data. Thus the picture displayed on the monitor device is gradually changed from the desired picture to the white picture.

Finally, the rotary knob is acted upon so that the addition ratio of the white picture data to the desired picture data will be 1:0, as a result of which only the desired picture data is supplied by the addition circuit to the monitor device and only the white picture is displayed.

Such fade-out is mainly employed for the end portion of a scene. The reason is that the fade-out of gradually displaying a white picture from a desired picture has a visual effect of permitting the viewer to recognize the end of a scene more clearly than with the usual method of abruptly terminating a picture.

However, it is only possible with the conventional fader device to effect fade-in or fade-out with a white picture or with a black picture.

If fade-in or fade-out could be effected with a desired color suited to a scene, it would be possible to realize scene changes more effectively.

SUMMARY OF THE INVENTION

It is therefore an object of the present invention to provide a fader device which enables fade-in or fade-out with a selected background color thereby to contribute to improved visual effects in scene changes.

The fader device for processing a digital picture with fade-in or fade-out according to the present invention has color designating means for designating the background color for fade-in or fade-out processing, and designated color picture data forming means for forming color picture data of the color designated by the color designating means and outputting the color picture data of the designated color. The fader device also has gain-controlling means for gradually varying the gain of picture data supplied from outside in dependence upon the speed of fade-in or fade-in processing, and calculating means for amplifying the picture data supplied from outside with a gain variably controlled by the gain controlling means, adding the amplified picture data to the color picture data from the designated color picture data forming means and outputting the resulting addition picture data (FIG. 1).

The fader device according to the present invention designates the background color for fade-in or fade-out processing by color designating means. When the background color is specified, the designated color picture forming means forms color picture data of the designated color and routes the color picture data to calculating means. The gain controlling means gradually variably controls the gain of the picture data supplied from outside in dependence upon the speed of the fade-in or fade-out processing.

Specifically, the gain control means includes means for outputting a coefficient which is gradually variably controlled in dependence upon the speed of fade-in or fade-out processing.

The gain control means forms a coefficient increased gradually with the speed of fade-in processing and decreased gradually with the speed of fade-out processing and routes the coefficient to the calculating means.

The calculating means includes subtraction means for subtracting the color picture data outputted from the designated color picture data forming means from the picture data supplied from outside, and multiplication means for multiplying picture data from the subtraction means with the coefficient from the gain controlling means. The calculating means also includes addition means for adding picture data supplied from the multiplication means to the color picture data outputted from the designated color picture data forming means.

The fade-in operation is performed as follows: The subtracting means subtracts the color picture data supplied from the designated color picture data forming means from picture data supplied from outside and transmits the resulting difference data to the multiplication means. The multiplication means multiplies picture data from the subtraction means with a gradually increasing coefficient supplied from the gain control means and routes the result of multiplication to the addition means. The addition means adds picture data supplied from the multiplication means to the color picture data supplied from the designated color picture data forming means and routes the resulting addition signal to a monitor unit.

This achieves fade-in processing which consists in gradually changing the picture displayed on the monitor unit from a picture of the designated color to the desired picture.

The fade-our processing is performed as follows: The subtraction means subtracts the color picture data supplied from the designated color picture data forming means from picture data supplied from outside and routes the resulting difference signal to the multiplication means. The multiplication means multiplies picture data from the subtraction means with a gradually decreasing coefficient supplied from the gain control means and routes the result of the multiplication to the addition means. The addition means adds picture data supplied from the multiplication means to the color picture data supplied from the designated color picture data forming means and routes the resulting addition signal to a monitor unit.

This achieves fade-out processing which consists in gradually changing the picture displayed on the monitor unit from the desired picture to a picture of the designated color.

DETAILED DESCRIPTION OF THE PREFERRED EMBODIMENTS

Figure 1:
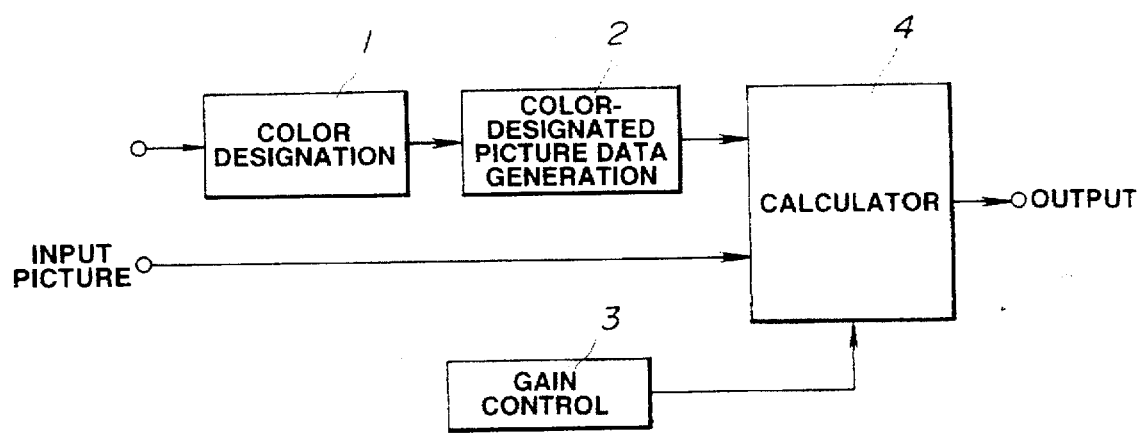
FIG. 1 is a block diagram of a fader device according to the present invention.

Referring to the drawings, a preferred embodiment according to the present invention will be explained in detail.

Figure 2:
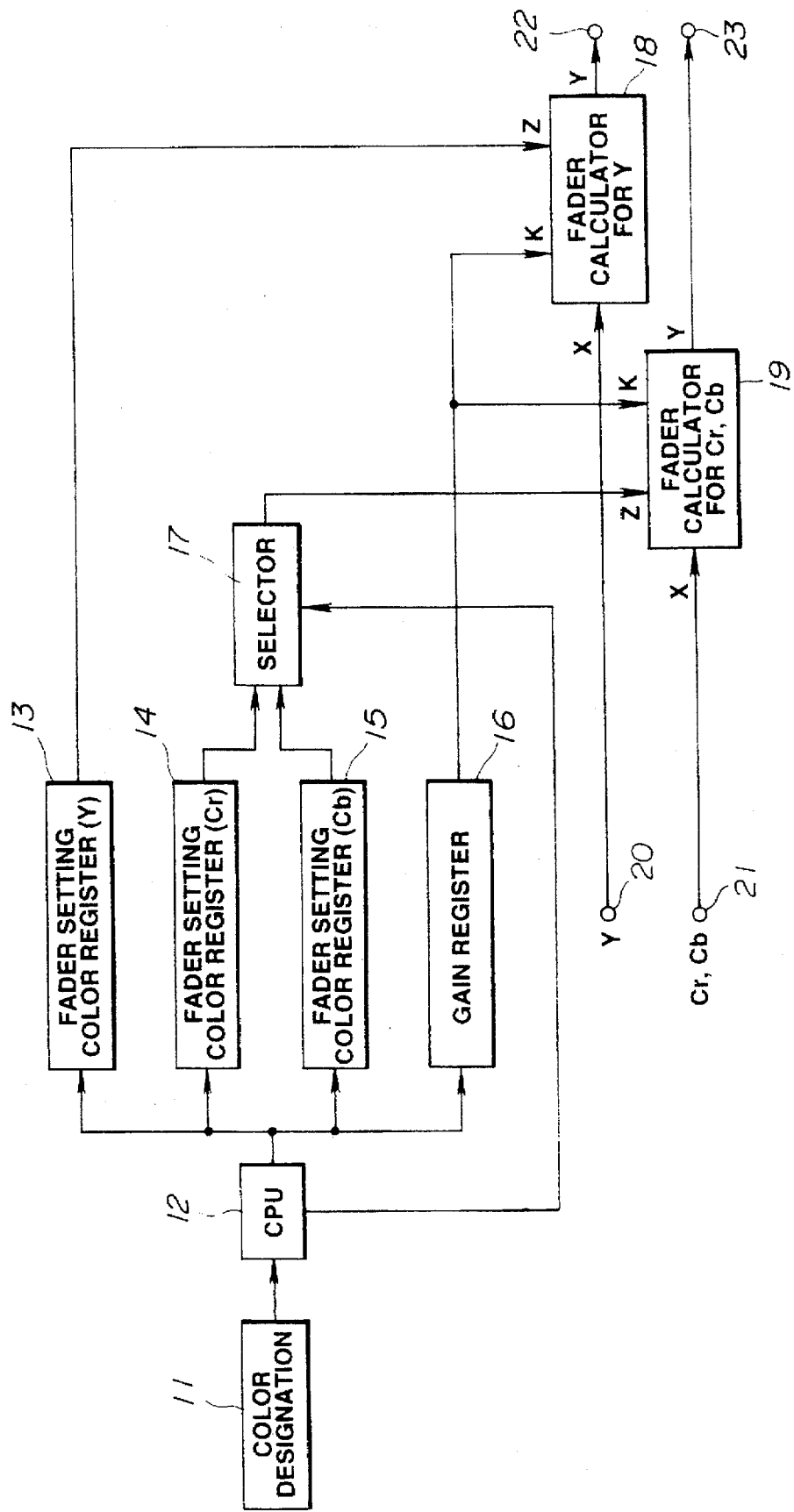
FIG. 2 is a block diagram of a fader according to an embodiment of the present invention.

The fader device according to the present invention may be applied to a fader device for effecting fade-out or fade-in based on digital component data with the ratio of the luminance data (Y-data) and two chroma data (Cr data and Cb data) of 4:2:2, as shown in FIG. 2.

The fader device according to the present invention has a color designating circuit 11 for designating the background color for effecting fade-in or fade-out and a central processing unit (CPU) 12 for controlling various components based upon the colors designated by the color designating circuit 11, as shown in FIG. 2.

The fader device also includes a fader setting color register for Y 13 for forming Y-data of the designated color under control of the CPU 12, a fader setting color register for Cr 14 for forming Cr-data of the designated color under control of the CPU 12, a fader setting color register for Cb 15 for forming Cb-data of the designated color under control of the CPU 12, a gain register 16 for forming and outputting a coefficient as later explained under control of the CPU 12, and a selector 17 for switching between the Cr data from the fader setting color register for Cr 14 and the Cb data from the fader setting color register for Cb 15 responsive to data processing timing.

In addition, the fader device also includes a fader calculating unit for Y 18 and a fader calculating unit for a Cr, Cb 19.

The calculating unit for fader for Y 18 effects fade-in or fade-out based upon Y-data of a picture supplied from outside via an input terminal 20, Y-data from the setting color register for fader for Y 13 and the coefficient supplied from the gain register 16. The calculating unit for fader for Cr and Cb 19 effects fade-in or fade-out based upon Cr and Cb data of a picture supplied from outside via an input terminal 21, Cr data from the fader setting color register for Cr 14 or Cb data from the fader setting color register for Cb 15, as selected by the selector 17, and the coefficient supplied from the gain register 16.

Figure 3:
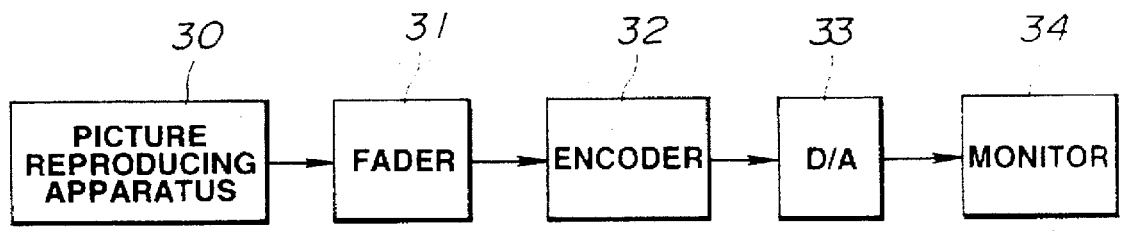
FIG. 3 is a block diagram of a picture reproducing device employing the fader device of FIG. 2.

The fader device of the illustrated embodiment, having the above-described constitution, may be applied to a picture reproducing system shown in FIG. 3.

The operation of the fader device of the illustrated embodiment is now explained in conjunction with that of the picture reproducing system, in which the fader device of the illustrated embodiment is applied as a fader device 31.

Referring to FIG. 3, the 4:2:2 picture data from a picture reproducing device 30, such as a video tape recorder, is supplied to the fader device 31.

The configuration of the fader device 31 is shown in FIG. 2. The user designates the background color for fade-in or fade-out by the color designating circuit 11. The CPU 12 recognizes the designated color and controls the fader setting color registers 13 to 15 for forming color picture data of the designated colors. The CPU 12 also controls the gain register 16 for gradually increasing or decreasing the output coefficient for fade-in or fade-out, respectively.

Thus, Y-data of the designated color is formed with the color designated by the fader setting color register for Y 13 and supplied to the fader calculating unit for Y 18. On the other hand, Cr data of the designated color is formed by the fader setting color register for Cr 14 and supplied to the selector 17. Similarly, Cb data of the designated color is formed by the fader setting color register for Cb 15 and supplied to the selector 17. The coefficient conforming to the fade-in or fade-out is formed by the gain register 16 and supplied to the fader calculating unit for Y 18 and to the fader calculating unit for Cr, Cb 19.

The selector 17 is adapted to be switched under control by the CPU 12.

The CPU 12 switches the selector 17 for selecting Cr data from the fader setting color register for Cr 14 if the fader calculating unit for Cr, Cb 19 effects fade-in or fade-out of Cr data, while switching the selector 17 for selecting Cb data from the fader setting color register for Cb 15 if the fader calculating unit for Cr, Cb 19 effects fade-in or fade-out of Cb data.

The Cr data ore Cb data, as selected by the selector 17, is supplied to the fader calculating unit for Cr, Cb 19.

Figure 4:
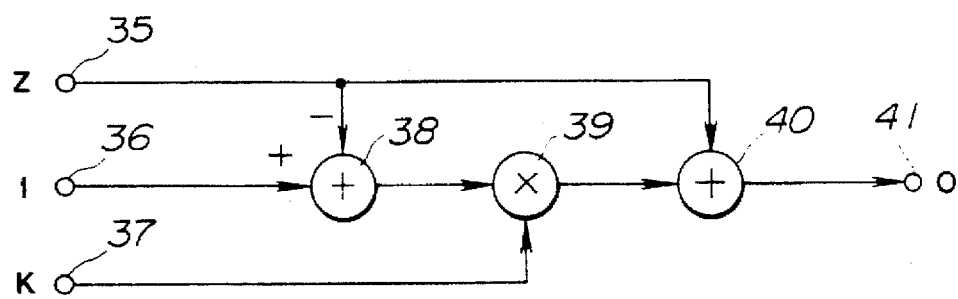
FIG. 4 is a block diagram of a fader calculating unit provided in the fader device of FIG. 2.

The fader calculating unit for Y 18 and the fader calculating unit for Cr, Cb 19 are configured as shown in FIG. 4.

In the fader calculating unit for Y 18, Y-data of a desired picture, supplied from the picture reproducing device 30 via the input terminal 20 of FIG. 2, is supplied via an input terminal 36 of FIG. 4 to a subtractor 38.

The subtracting unit 38 is also fed with Y-data of the background color for fade-in or fade-out from the fader setting color register for Y 13 via an input terminal 35. The subtractor 38 subtracts Y-data of the background color from the Y-data of the desired picture and routes the resulting data to a multiplier 39.

The multiplier 39 is fed with a coefficient formed in dependence upon fade-in or fade-out from the gain register 16. The multiplier 39 multiplies the difference data with the coefficient and routes the result of multiplication to an adder 40.

The adder 40 is fed via the input terminal 35 with Y data of the background color for fade-in or fade-out from the fader setting color register for Y 13. The adder 40 adds the Y data of the background color to the result of multiplication and outputs the result of addition as picture data processed with fade-in or fade-out at an output terminal 41.

In the fader calculating unit for Cr, Cb 19, the Cr, Cb data of the desired picture, supplied via the input terminal 21 shown in FIG. 2 from the picture reproducing device 30, are supplied to the subtractor 38 via the input terminal 36 shown in FIG. 4.

The CPU 12 controls the selector 17 for selecting Cr data from the fader setting color register for Cr 14 in case the fader calculating unit for Cr, Cb 19 effects fade-in or fade-out of Cr data, and for selecting Cb data from the fader setting color register for Cb 15 in case the fader calculating unit for Cr, Cb 19 effects fade-in or fade-out of Cb data. The Cr data and Cb data, selected by the selector 17, are supplied via an input terminal 35 shown in FIG. 4 to the subtractor 38 and to the adder 40.

The subtractor 38 subtracts the Cr, Cb data of the background color from the Cr, Cb data of the desired picture and routes the difference data to the multiplier 39.

The multiplier 39 is fed with a coefficient formed in dependence upon the fade-in or fade-out by the gain register 18. The multiplier 39 multiplies the difference data with the coefficient and routes the result of multiplication to the adder 40.

The adder 40 adds the Cr, Cb data of the background color to the result of multiplication and outputs the result of addition at the output terminal 41 as picture data processed with fade-in or fade-out.

That is, the fader calculating unit for Y 18 or the fader calculating unit for Cr, Cb 19 executes an arithmetic operation of $$O=K(I-Z)+Z$$

where Z is the Y data or Cr, Cb data for the background color for fade-in or fade-out, I is Y data or Cr, Cb data for the desired picture from the picture reproducing device 30, K is a coefficient from the gain register 16 and O is Y data or Cr, Cb data outputted by the fader calculator for Y 18 or the fader calculating unit for Cr, Cb 19.

Figure 5D:
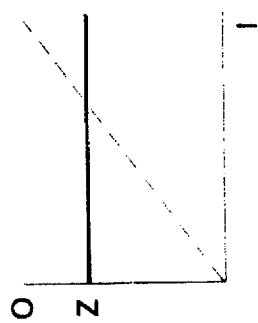
FIGS. 5A, 5B, 5C and 5D are graphs showing input/output characteristics of the fader device of FIG. 2.
Figure 5C:
Figure 5B:
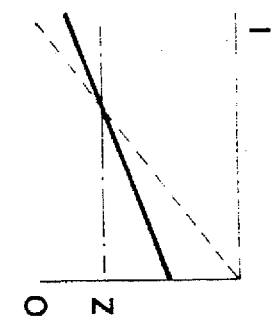
Figure 5A:
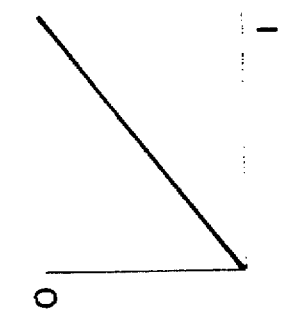

The fade-out processing is now explained in detail. The CPU 12 sets the coefficient supplied from the gain register 16 to the multiplier 39 to 1 by way of an interrupt operation during the vertical blanking period which is formed every 1/30 second. Thus the input/output characteristics of the calculating units for faders 18, 19 become rectilinear as shown in FIG. 5A. The calculating units for faders 18, 19 directly output Y data and Cr, Cb data of the desired picture supplied from the picture reproducing device 30.

The CPU 12 then sets the coefficient, supplied from the gain register 16 to the multiplier 39 during the vertical blanking period gradually to a value less than 1. Thus the proportion of the Y data and the Cr, Cb data of the background color in the outputs of the fader calculating units 18, 19 becomes higher than that of the Y data and Cr, Cb data of the desired picture, as shown by solid lines in FIGS. 5B and 5C. Thus the input/output characteristics of the fader calculating units 18, 19, shown by solid lines in FIGS. 5B and 5C, approach the colors towards which the faders are converged, that is the background colors for fade-in or fade-out as set by the user, as indicated by chain-dotted lines in FIGS. 5B and 5C.

The CPU 12 then sets the coefficient supplied from the gain register 16 to the multiplier 39 during the vertical blanking period 39 to zero. Thus the input/output characteristics overlap with the colors towards which the faders are converged, so that only the Y data and Cr, Cb data of the desired color are outputted from the calculating units for faders 18, 19.

For fade-in, the control is reversed from the above-described control. The CPU 12 first sets the coefficient supplied from the gain register 6 to the multiplier 39 to zero during the vertical blanking period. Thus the input/output characteristics of the fader calculating units 18, 19 overlap with the colors towards which the faders are converged, as shown in FIG. 5D. The fader calculating units 18, 19 output only Y data and Cr, Cb data of the background color.

The CPU 12 sets the coefficient supplied during the vertical blanking period from the gain register 16 to the multiplier 39 so as to gradually approach to 1. Thus the proportion of Y data and Cr, Cb data of the desired picture in the outputs of the fader calculating units 18, 19 becomes higher than that of Y data and Cr, Cb data of the background color, as shown by solid lines in FIGS. 5C and 5B. Consequently, the input/output characteristics of the fader calculating units 18, 19 as shown by solid lines in FIGS. 5C and 5B approach the initial input/output characteristics indicated by broken lines, that is the state in which only Y data and Cr, Cb data of the desired picture are outputted.

The CPU 12 sets the coefficient supplied from the gain register 16 to the multiplier 39 during the vertical blanking period to 1. Thus the input/output characteristics of the fader calculating units 18, 19 become rectilinear as shown in FIG. 5A. The fader calculating units 18, 19 directly output Y data and Cr, Cb data of the desired picture supplied from the picture reproducing device 30.

Thus the Y data and Cr, Cb data, processed with fade-in or fade-out by the fader calculating units 18, 19 are supplied via output terminals 22, 23 to an encoder 32 shown in FIG. 3.

The encoder 32 generates television data conforming to e.g., the NTSC system, based upon digital composite data formed by the Y data and Cr, Cb data. These television data are fed to a D/A converter 33. The D/A converter 33 converts the television data of the NTSC system into analog data to form television signals of the NTSC system which are supplied to a monitor unit 34.

Thus, when the fader operation is fade-in, a desired picture is gradually displayed on the monitor unit 34 from the picture of the designated color. When the fader operation is fade-out, a picture of the designated color is gradually displayed on the monitor unit 34 from the desired picture.

Thus, with the fader device of the present invention, fade-in or fade-out to the desired color may be achieved, so that fade-in or fade-out processing may be achieved with the picture of the color conforming to the scene and hence the visual effects of manifesting scene transitions more effectively may be achieved.

Although the foregoing description has been made in connection with application of the present invention to a fader device for effecting fade-in or fade-out based upon the so-called 4:2:2 digital component data, the present invention may similarly be applied to a fader device for processing R, G and B colors with fade-in or fade-out.

In addition, although the foregoing description has been made in connection with encoding for NTSC system, encoding may also be performed in accordance with the desired television system, such as PAL or SECAM system.

The fader device according to the present invention is able to perform fade-in or fade-out to a picture of desired color.

Thus the fade-in or fade-out may be effected with a picture of the color conforming to the scene such that it becomes possible to achieve visual effects of manifesting scene transitions more effectively, thus contributing to improvement in special picture processing techniques.

What is claimed is:

1. A fader device for processing a digital picture formed of input picture data with fade-in or fade-out processing comprising:

color designating means for designating a background color for the fade-in or fade-out processing;

designated color picture data forming means for forming color picture data of the background color designated by said color designating means and outputting the color picture data of the designated color;

gain control means for gradually varying a gain of the input picture data in dependence upon a selected speed of the fade-in or fade-in processing; and calculating means for amplifying the input picture data with a gain variably controlled by said gain control means, adding the amplified picture data to the color picture data of the designed color from said designated color picture data forming means and outputting a resultant addition picture data, wherein said gain control means outputs a coefficient gradually variable controlled in dependence upon the speed of the fade-in or fade-out processing; and wherein said calculating means includes subtraction means for subtracting the color picture data formed by said designated color picture data forming means from the input picture data;

multiplication means for multiplying picture data from said subtraction means with the coefficient from said gain control means; and addition means for adding picture data from said multiplication means to the color picture data from said designated color picture data forming means for producing said addition picture data.

2. A fader device for processing a digital picture formed of input picture data with fade-in or fade-out processing comprising:

color designating means for designating a background color for the fade-in or fade-out processing;

designated color picture data forming means for forming color picture data of the background color designated by said color designating means and outputting the color picture data of the designated color;

gain control means for gradually varying a gain of the input picture data in dependence upon a selected speed of the fade-in or fade-in processing; and calculating means for amplifying the input picture data with a gain variably controlled by said gain control means, adding the amplified picture data to the color picture data of the designed color from said designated color picture data forming means and outputting a resultant addition picture data, wherein said calculating means executes an arithmetic operation of $$O = K(I-Z) + Z$$

where Z is the picture data of the background color for fade-in processing or fade-out processing, I is the input picture data, K is a coefficient gradually variably controlled in dependence upon the speed of fade-in processing or fade-out processing by said gain control means; and O is an output of said calculating means.

3. A fader device for processing a digital picture formed of input picture data with fade-in or fade-out processing comprising:

color designating means for designating a background color for the fade-in or fade-out processing;

designated color picture data forming means for forming color picture data of the background color designated by said color designating means and outputting the color picture data of the designated background color;

coefficient controlling means for variably controlling a coefficient for determining a ratio of the color picture data formed by said designated color picture data forming means and the input picture data;

color information controlling means for controlling said designated color picture data forming means and said coefficient controlling means in dependence upon the background color designated by said color designating means; and calculating means for amplifying the input picture data with the coefficient variably controlled by said coefficient control means, adding said picture data to the color picture data from said designated color picture data forming means and outputting a resultant addition signal.

\* \* \* \* \*